United States Patent
Wang et al.

(10) Patent No.: US 12,542,868 B2
(45) Date of Patent: Feb. 3, 2026

(54) METHOD FOR SWITCHING AUDIO RECEPTION IN VIDEO CONFERENCE AND VIDEO CONFERENCING SYSTEM

(71) Applicant: Merry Electronics(Shenzhen) Co., Ltd., ShenZhen (CN)

(72) Inventors: Shuo-Yu Wang, Taichung (TW); Chan-An Wang, Taichung (TW); Hsiu-Ling Lin, Taichung (TW); Chung-Yi Huang, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 193 days.

(21) Appl. No.: 18/539,308

(22) Filed: Dec. 14, 2023

(65) Prior Publication Data

US 2025/0150555 A1  May 8, 2025

(30) Foreign Application Priority Data

Nov. 8, 2023 (TW) ................. 112143048

(51) Int. Cl.
  *H04N 7/15* (2006.01)
  *G06T 7/70* (2017.01)
  *G06V 40/20* (2022.01)
  *H04N 7/14* (2006.01)

(52) U.S. Cl.
  CPC ............. *H04N 7/152* (2013.01); *G06T 7/70* (2017.01); *G06V 40/20* (2022.01); *H04N 7/147* (2013.01); *G06V 2201/07* (2022.01)

(58) Field of Classification Search
  CPC ........ H04N 7/152; H04N 7/147; G06V 40/20; G06V 2201/07
  See application file for complete search history.

(56) References Cited

U.S. PATENT DOCUMENTS

| | | | |
|---|---|---|---|
| 2009/0086949 A1* | 4/2009 | Caspi ................... | H04M 3/568 379/202.01 |
| 2017/0374118 A1* | 12/2017 | Pevzner ................ | H04L 65/613 |
| 2021/0051298 A1* | 2/2021 | Atkins .................. | H04N 7/147 |

* cited by examiner

*Primary Examiner* — Amal S Zenati
(74) *Attorney, Agent, or Firm* — JCIPRNET (57) ABSTRACT

A method for switching audio reception in a video conference and a video conferencing system are provided. In a case of starting the video conference, relative positions of participants in a conference space and behavioral events of participants are obtained by identifying a video signal. Based on the behavioral event of each participant, whether each participant is in a non-speaking behavior is determined. When a participant is determined to be a non-speaker in the non-speaking behavior, an audio reception range of an audio reception device is adjusted to filter a voice of the non-speaker based on the relative position of the non-speaker in the conference space. When a participant is determined to be a speaker not in the non-speaking behavior, the audio reception range of the audio reception device is adjusted to receive a voice of the speaker based on the relative position of the speaker in the conference space.

18 Claims, 7 Drawing Sheets

METHOD FOR SWITCHING AUDIO RECEPTION IN VIDEO CONFERENCE AND VIDEO CONFERENCING SYSTEM

CROSS-REFERENCE TO RELATED APPLICATION

This application claims the priority benefit of Taiwan application serial no. 112143048, filed on Nov. 8, 2023. The entirety of the above-mentioned patent application is hereby incorporated by reference herein and made a part of this specification.

BACKGROUND

Technical Field

The disclosure relates to a video conferencing system and a method of using the same, and in particular to a method for switching audio reception in video conference and a video conferencing system.

Description of Related Art

With the development of the Internet, the usage of many online conferencing software has also increased significantly. People can conduct video conferences with remote users without moving around. Generally speaking, in a video conference, the participant needs to switch the microphone mode to mute or audio reception. In the case where the participant merely needs to speak temporarily (such as answering the phone or discussing with other participants present) and does not need to be heard by other remote end participants, if a participant forgets to switch the microphone to the mute mode, then it will cause other remote end participants to hear discussions that are irrelevant to the meeting and thus the progress of the conference is disturbed.

SUMMARY

The disclosure provides a method for switching audio reception in a video conference and a video conferencing system, which can automatically switch between audio reception and voice filtering in response to the action of a participant.

The method for switching audio reception in the video conference of the disclosure uses a processor to execute the following steps in the case of starting the video conference, which includes the following. Relative positions of a plurality of participants in a conference space and a behavioral event of each of the participants are obtained by identifying a video signal. Whether each of the participants is in a non-speaking behavior is determined based on the behavioral event of each of the participants. In response to one of the participants being determined to be a non-speaker in the non-speaking behavior, an audio reception range of an audio reception device is adjusted to filter a voice of the non-speaker based on the relative position of the non-speaker in the conference space. In response to one of the participants being determined to be a speaker not in the non-speaking behavior, the audio reception range of the audio reception device is adjusted to receive a voice of the speaker based on the relative position of the speaker in the conference space.

In an embodiment of the disclosure, obtaining the relative positions of the plurality of participants in the conference space and the behavioral event of each of the participants by identifying the video signal includes the following. Through a human image recognition module, each of the participants comprised in the video signal is identified, and the relative position of each of the participants in the conference space is obtained. Through an image recognition module, the behavioral event of each of the participants is identified.

In an embodiment of the disclosure, the method further includes the following. A human voice is separated from an audio signal through a voiceprint recognition module after receiving the audio signal. The human voice is matched with a corresponding one of the participants. Whether the one of the participants is in the non-speaking behavior is determined based on the human voice and the behavioral event of the matched one of the participants.

In an embodiment of the disclosure, matching the human voice with the corresponding one of the participants includes the following. A sound source positioning algorithm is executed to determine a source position of the human voice in the conference space. The human voice is matched with the corresponding one of the participants based on the relative position and the source position.

In an embodiment of the disclosure, determining whether the one of the participants is in the non-speaking behavior based on the human voice and the behavioral event of the matched one of the participants includes the following. Through an audio recognition module, a sound intensity of the human voice is recognized. Whether the sound intensity is less than a predetermined value is determined. Whether the behavioral event of the one of the participants matching the human voice conforms to a predetermined event is determined. In a case where the behavioral event conforms to the predetermined event and the sound intensity is less than the predetermined value, that the one of the participants is in the non-speaking behavior is determined.

In an embodiment of the disclosure, the method further includes the following. Images are captured through an image capturing device at intervals of a sampling time to obtain the video signal. Voices are received through the audio reception device at the intervals of the sampling time to obtain the audio signal.

In an embodiment of the disclosure, the method further includes the following. By identifying the video signal through the processor, each of the participants comprised in the video signal is identified, and a video clip corresponding to each of the participants is obtained from the video signal. A user interface is displayed on a display device through the processor, and the video clip corresponding to each of the participants is displayed on the user interface.

In an embodiment of the disclosure, the user interface includes a plurality of display areas, each of the display areas corresponds to each of the participants, and each of the display areas is configured to display the video clip corresponding to each of the participants. After displaying the user interface on the display device through the processor, the following operations are further included. A mute mark is displayed in one of the display areas displaying the video clip corresponding to the non-speaker. An audio reception mark is displayed in another one of the display areas displaying the video clip corresponding to the speaker.

In an embodiment of the disclosure, filtering the voice of the non-speaker includes the following. Through the processor, based on the relative position of the non-speaker in the conference space, the human voice corresponding to the relative position in an audio signal is filtered.

The video conferencing system of the disclosure includes a storage storing an application program, an image capturing device obtaining a video signal, an audio reception device, and a processor coupled to the storage, the image capturing device, and the audio reception device. The processor is configured to perform the following. The application program is executed to start a video conference, and in a case of starting the video conference, the following operations are included. Relative positions of a plurality of participants in a conference space and a behavioral event of each of the participants are obtained by identifying a video signal. Whether each of the participants is in a non-speaking behavior is determined based on the behavioral event of each of the participants. In response to one of the participants being determined to be a non-speaker in the non-speaking behavior, an audio reception range of an audio reception device is adjusted to filter a voice of the non-speaker based on the relative position of the non-speaker in the conference space. In response to one of the participants being determined to be a speaker not in the non-speaking behavior, the audio reception range of the audio reception device is adjusted to receive a voice of the speaker based on the relative position of the speaker in the conference space.

Based on the above, the disclosure can identify the relative position of each participant in the conference space in the video signal and determine whether to perform audio reception or voice filtering based on whether each participant is in a non-speaking behavior. Accordingly, it is possible to avoid audio reception in a case where participants do not want to be heard by others, thereby the quality of audio reception of the video conference is improved.

DESCRIPTION OF THE EMBODIMENTS

Figure 1:
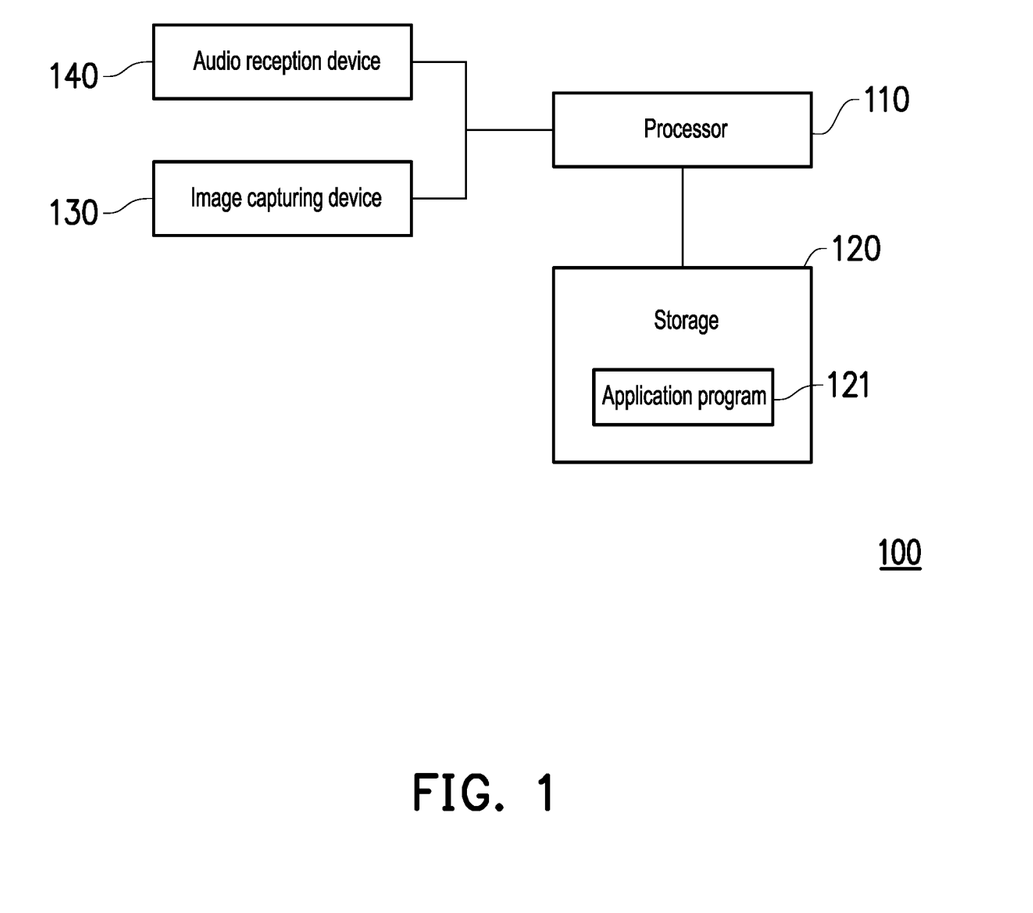
FIG. 1 is a block diagram of a video conferencing system according to an embodiment of the disclosure.

FIG. 1 is a block diagram of a video conferencing system according to an embodiment of the disclosure. Referring to FIG. 1, a video conferencing system 100 includes a processor 110, a storage 120, an image capturing device 130, and an audio reception device 140. The processor 110 is coupled to the storage 120, the image capturing device 130, and the audio reception device 140.

The processor 110 is, for example, a central processing unit (CPU), a physics processing unit (PPU), a programmable microprocessor, an embedded control chip, a digital signal processor (DSP), an application specific integrated circuit (ASIC), or other similar devices.

The storage 120 is, for example, any type of fixed or removable random access memory (RAM), read-only memory (ROM), flash memory, hard disk, or other similar devices, or a combination of the above devices. One or more program code fragments are stored in the storage 120, and the program code fragments are executed by the processor 110 after being installed. In this embodiment, the storage 120 includes an application program 121 configured to execute a video conference. In a case of starting the video conference, the processor 110 executes the following method for switching audio reception in the video conference.

The image capturing device 130 may be, for example, a camera or a video camera using a charge coupled device (CCD) lens or a complementary metal oxide semiconductor transistors (CMOS) lens. For example, the image capturing device 130 may adopt a wide-angle camera, a half-celestial camera, or a full-celestial camera, etc.

The audio reception device 140 is, for example, a microphone. In an embodiment, merely one audio reception device 140 may be disposed. In other embodiments, multiple audio reception devices 140 may also be disposed.

Figure 2:
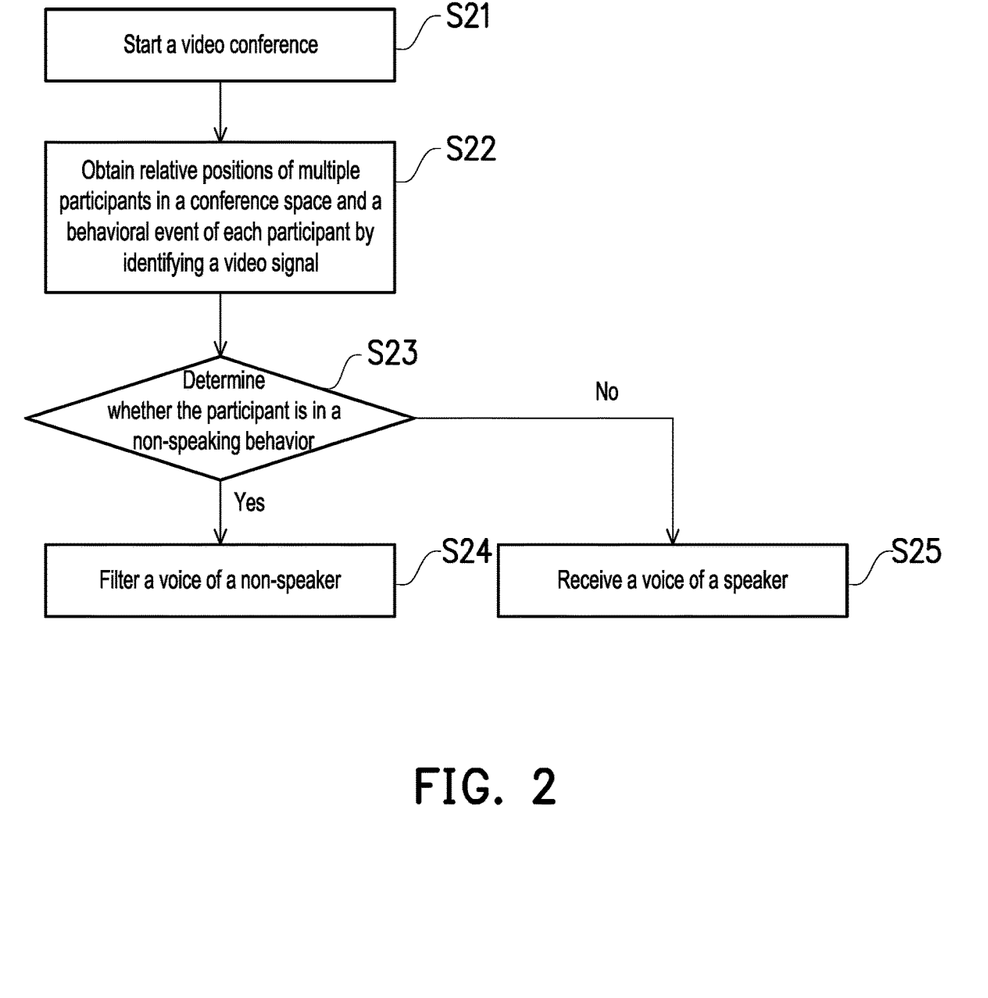
FIG. 2 is a flow chart of a method for switching audio reception in a video conference according to an embodiment of the disclosure.

FIG. 2 is a flow chart of a method for switching audio reception in a video conference according to an embodiment of the disclosure. Please refer to FIG. 1 together with FIG. 2. In Step S21, the processor 110 is used to execute the application program 121 to start the video conference.

In the case of starting the video conference, in Step S22, by identifying a video signal, the relative positions of multiple participants in a conference space and a behavioral event of each participant are obtained. Assuming that the shooting angle of the image capturing device 130 covers all participants in the conference space (spaces such as a conference room, an office, a lounge), the video signal captured by the image capturing device 130 during the video conference includes human images of all participants. Afterward, the processor 110 executes an image recognition algorithm to find each human image in the video image, and the relative position of each participant in the conference space is calculated through the positions of the human images in each image frame. Furthermore, the processor 110 executes the image recognition algorithm to identify the behavioral event of each participant. For example, the setting may be to detect the gestures corresponding to each human image, detect the status of the face of each human image being covered, detect the distance changes between the human images in multiple image frames, etc., to obtain the behavioral event of each participant.

Next, in Step S23, based on the behavioral event of each participant, whether each participant is in a non-speaking behavior is determined. The non-speaking behavior is defined as: during a video conference, a participant speaks privately and does not want to be heard by the other party in the video conference, that is, the non-speaking behavior which needs to be filtered. For example, various predetermined events belonging to the non-speaking behavior may be defined in advance in the storage 120, so that the processor 110 can compare the identified behavioral event with the predetermined events defined in advance to determine whether the participant is in the non-speaking behavior.

In an embodiment, the predetermined event may include at least one of a mouth-covering event, a back-of-the-hand-facing-forward event, and an approaching-to-others event. In an embodiment, the mouth-covering event may be defined as: part of or all of the mouth area is covered. The back-of-the-hand-facing-forward event is defined as: the back of the hand is detected. The approaching-to-others event is defined as: the distance between the human images of two participants is less than a predetermined value, and it is determined to be the approaching-to-others event. However, the above are merely examples and the disclosure is not limited thereto.

In response to one of the participants being determined to be a non-speaker in the non-speaking behavior, in Step S24, the processor 110 adjusts an audio reception range of the audio reception device 140 to filter a voice of a non-speaker based on the relative position of the non-speaker in the conference space. In an embodiment, the processor 110 filters the human voice corresponding to the relative position in the audio signal based on the relative position of the non-speaker in the conference space. For example, the corresponding human voice is found according to the relative position of the non-speaker in the conference space, and the audio reception range of the audio reception device 140 is adjusted to ensure that the voice of the non-speaker is not included based on a sound intensity.

Merely one audio reception device 140 may be provided, or multiple audio reception devices 140 may be provided to form an audio reception system, which is not limited hereto.

In response to one of the participants being determined to be a speaker not in the non-speaking behavior, in Step S25, the processor 110 adjusts the audio reception range of the audio reception device 140 to receive a voice of the speaker based on the relative position of the speaker in the conference space. In an embodiment, the processor 110 keeps the human voice corresponding to the relative position in the audio signal based on the relative position of the speaker in the conference space.

In addition, in other embodiments, a manual setting function may also be set in the application program 121. Accordingly, a user may manually set the audio reception range of the audio reception device 140 through the manual setting function.

Figure 3:
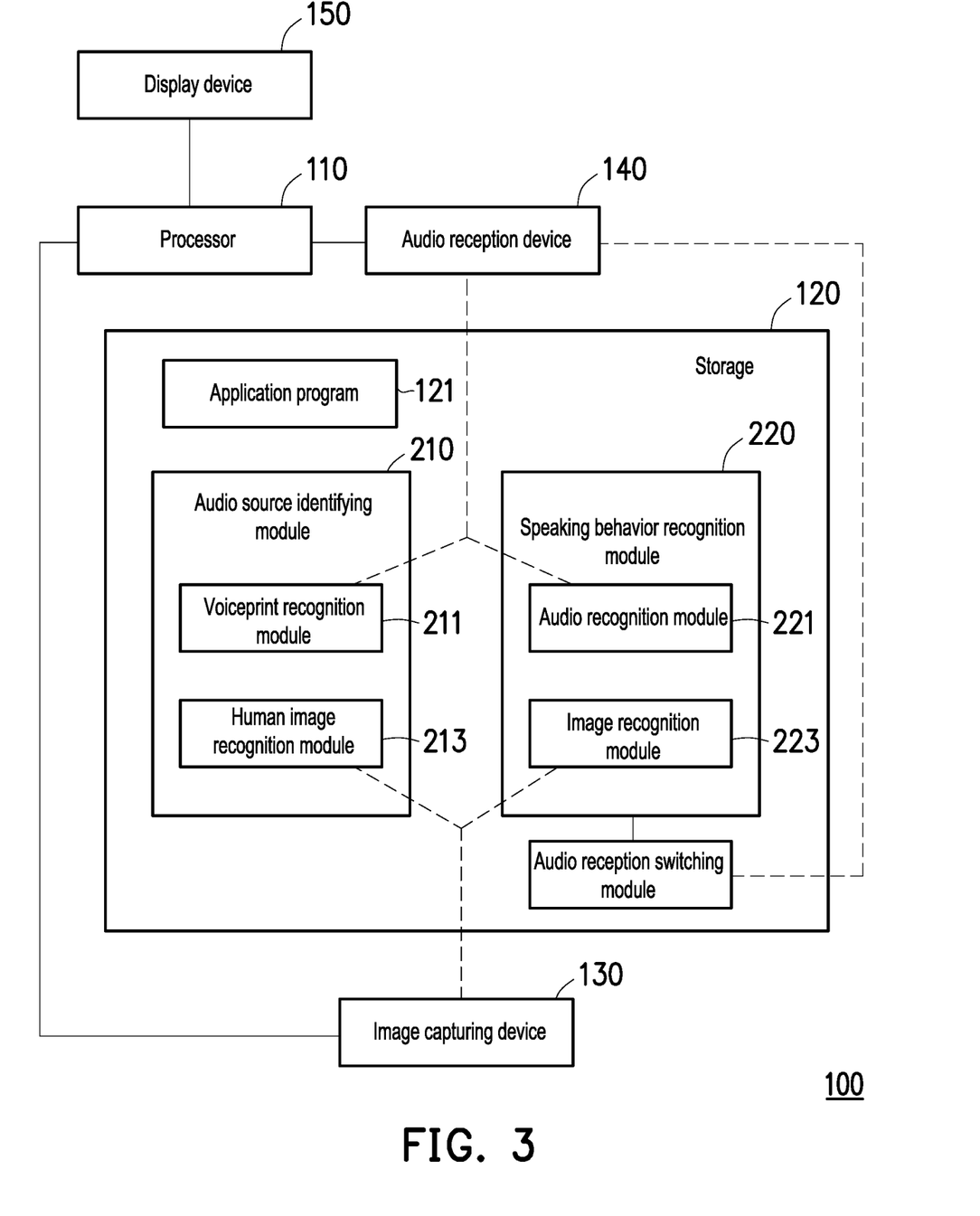
FIG. 3 is a block diagram of the video conferencing system according to an embodiment of the disclosure.

FIG. 3 is a block diagram of the video conferencing system according to an embodiment of the disclosure. The embodiment shown in FIG. 3 is an application example of the embodiment in FIG. 1. In FIG. 3, the video conferencing system 100 also includes a display device 150. The display device 150 is configured to present a screen of the video conference. For example, a liquid crystal display (LCD), a plasma display, a projection system, etc. may be adopted to implement the display device 150.

The storage 120 also includes an audio source identifying module 210, a speaking behavior recognition module 220, and an audio reception switching module 230. The audio source identifying module 210 is configured to match the human image of the participant with the human voice corresponding to the participant. The speaking behavior recognition module 220 is configured to detect whether the participant is in the non-speaking behavior. In an embodiment, the audio source identifying module 210 may further include a voiceprint recognition module 211 and a human image recognition module 213. The speaking behavior recognition module 220 includes an audio recognition module 221 and an image recognition module 223.

The voiceprint recognition module 211 is configured to receive the audio signal and separate all human voices (one or more human voices) from the audio signal. The human image recognition module 213 is configured to receive the video signal and identify each participant included in the video signal and obtain the relative position of each participant in the conference space. The audio recognition module 221 is configured to receive audio signals and recognize the sound intensity of each human voice. The image recognition module 223 is configured to receive the video signal and identify the behavioral event of each participant in the video signal. For example, detecting the status of the face of the human image corresponding to each participant being covered, detecting the gestures corresponding to each human image to determine whether the back of the hand appears, detecting the distance changes between the human images in the multiple image frames, etc.

Figure 4:
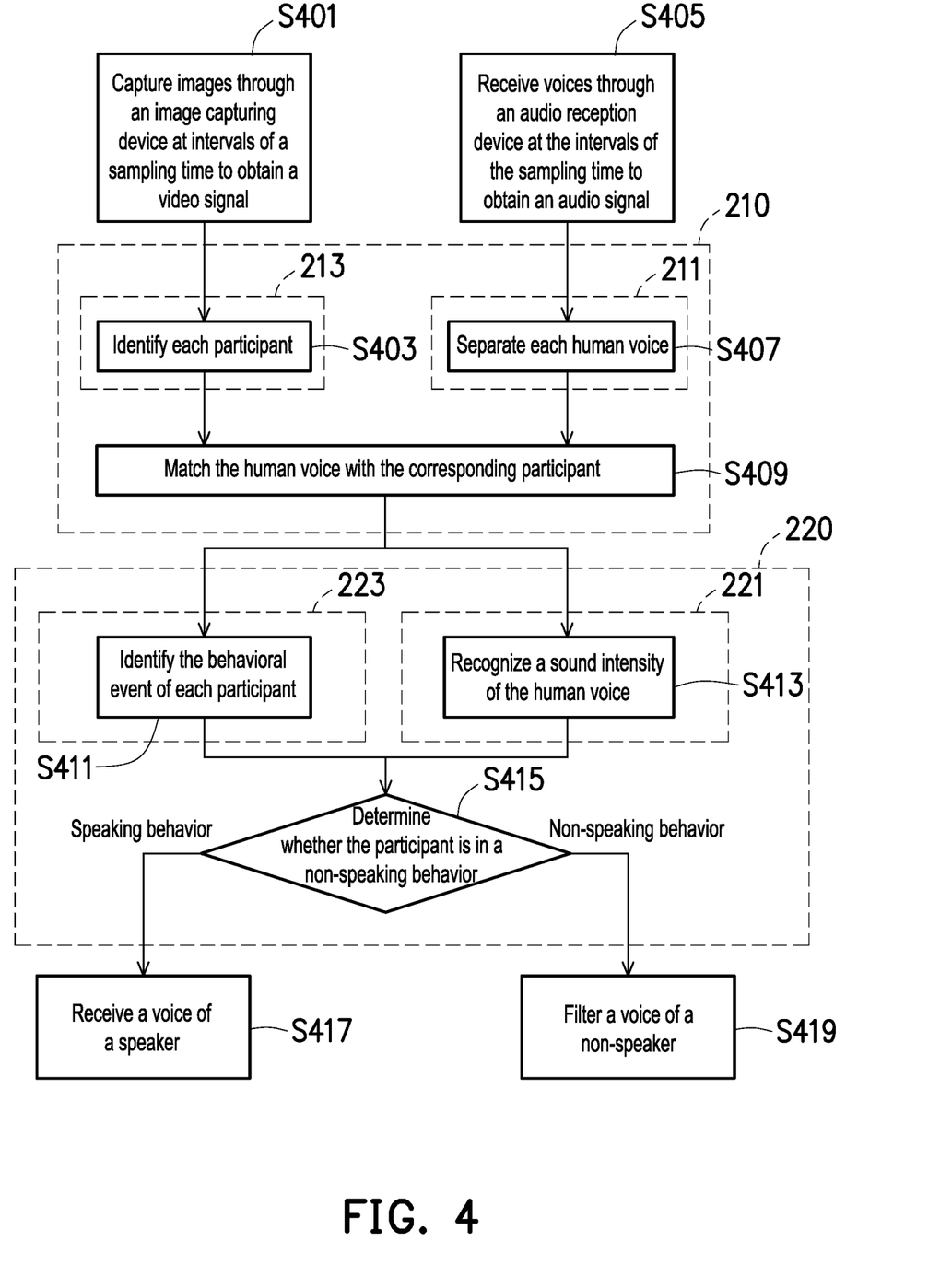
FIG. 4 is a flow chart of the method for switching audio reception in the video conference according to an embodiment of the disclosure.
Figure 5A:
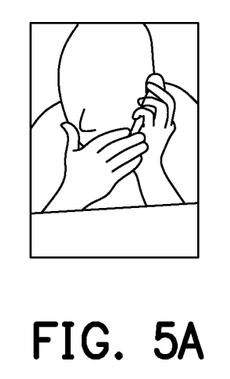
FIG. 5A to FIG. 5E are schematic diagrams of multiple predetermined events according to an embodiment of the disclosure.
Figure 5B:
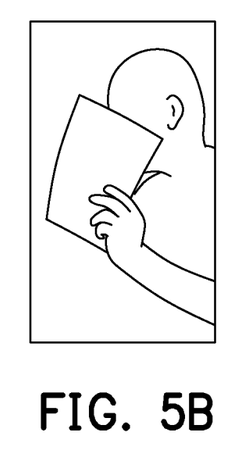
Figure 5C:
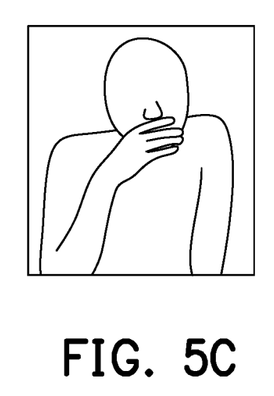
Figure 5D:
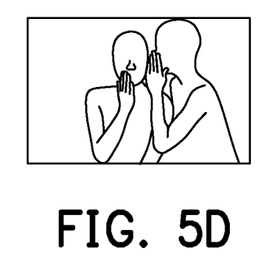
Figure 5E:
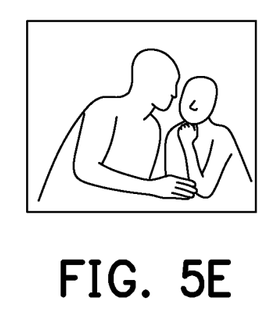

FIG. 4 is a flow chart of the method for switching audio reception in the video conference according to an embodiment of the disclosure. Please refer to FIG. 3 together with FIG. 4. In Step S401, the processor 110 captures images through the image capturing device 130 at intervals of a sampling time to obtain the video signal. Moreover, in Step S405, the processor 110 receives voices through the audio reception device 140 at the intervals of the sampling time to obtain the audio signal. The time when the image capturing device 130 captures the images is set to be the same as the time when the audio reception device 140 receives the voices. Therefore, corresponding video signals and audio signals are obtained every interval of the sampling time.

After obtaining the video signal and the audio signal, the processor 110 drives the audio source identifying module 210 to match each human voice in the audio signal with a human image of a corresponding participant in the video signal. Specifically, in Step S403, the processor 110 identifies each participant included in the video signal through the human image recognition module 213, obtains the human image corresponding to each participant, and obtains the relative position of each participant in the conference space. For example, the human image recognition module 213 can identify each image frame of the video conference to find immovable objects such as furniture or furnishings in the conference space, thereby determining the relative position of each participant in the conference space. Alternatively, the human image recognition module 213 can also determine the relative position between movable objects, thereby determining the relative position of each participant in the conference space.

In Step S407, human voices belonging to different people are separated from the audio signal through the voiceprint recognition module 211. Moreover, the voiceprint recognition module 211 further executes the sound source positioning algorithm to determine the source position of each human voice in the conference space. Afterward, in Step S409, the processor 110 matches each human voice with a corresponding one of the participants based on each relative position obtained by the human image recognition module 213 and each source position obtained by the voiceprint recognition module 211 through the audio source identifying module 210. Here, since not every participant speaks during the audio reception time, the quantity of human voices in the audio signal may be less than the quantity of participants in the video signal. Accordingly, the processor 110 performs the matching with the human image of the participant based on the human voice separated.

After matching each human voice with the corresponding participant, the processor 110 drives the speaking behavior recognition module 220 to determine whether the participant is in the non-speaking behavior based on the video signal and the audio signal. Specifically, in Step S411, the behavioral event of each participant is identified through the image recognition module 223. Afterward, whether the behavioral event conforms to the predetermined event defined in the storage 120 is further determined. The predetermined event may include at least one of the mouth-covering event, the back-of-the-hand-facing-forward event, and the approaching-to-others event.

FIG. 5A to FIG. 5E are schematic diagrams of multiple predetermined events according to an embodiment of the disclosure. The predetermined events shown in FIG. 5A include the mouth-covering event and the back-of-the-hand-facing-forward event. The predetermined event shown in FIG. 5B merely includes the mouth-covering event. The predetermined events shown in FIG. 5C include the mouth-covering event and the back-of-the-hand-facing-forward event. The predetermined events shown in FIG. 5D include the mouth-covering event, the back-of-the-hand-facing-forward event, and the approaching-to-others event. The predetermined event shown in FIG. 5E include the approaching-to-others event. FIG. 5A to FIG. 5E are merely examples and the disclosure is not limited thereto.

In Step S413, the sound intensity of each human voice is recognized through the audio recognition module 221. For example, the audio recognition module 221 uses the signal corresponding to each human voice separated by the voice-print recognition module 211 to determine the sound intensity.

After obtaining the behavioral event of each participant and the sound intensity corresponding to each human voice, in Step S415, whether the participant is in the non-speaking behavior is determined through the speaking behavior recognition module 220. When the participant is determined to be in a speaking behavior, the participant is regarded as the speaker. In Step S417, the audio reception switching module 230 switches the corresponding state of the speaker to an audio reception state to receive the voice of the speaker. When the participant is determined to be in the non-speaking behavior, the participant is regarded as a non-speaker. In Step S419, the audio reception switching module 230 switches the corresponding state of the non-speaker to a mute state to filter the voice of the non-speaker.

In this embodiment, the speaking behavior recognition module 220 may be set to determine whether each participant is in the non-speaking behavior based on the behavioral event of each participant and the sound intensity of the corresponding human voice simultaneously.

In an embodiment, the speaking behavior recognition module 220 may be set to determine whether the participant is in the non-speaking behavior based on the matched human image of each participant and the corresponding human voice. For example, after the audio recognition module 221 recognizes the sound intensity of the human voice, whether the sound intensity is less than the predetermined value is further determined. Moreover, after the image recognition module 223 obtains the behavioral event of the participant, whether the behavioral event of the participant matching the human voice conforms to the predetermined event is determined. In the case where the behavioral event conforms to the predetermined event and the sound intensity is less than the predetermined value, the participant is determined to be a non-speaker in the non-speaking behavior. Furthermore, in Step S419, the voice of the non-speaker is filtered.

On the other hand, in the case where the behavioral event conforms to the predetermined event and the sound intensity is not less than the predetermined value, the participant is determined to be a speaker in the speaking behavior. Furthermore, in Step S417, the voice of the speaker is received.

In another embodiment, the speaking behavior recognition module 220 may also be further set to: regardless of the sound intensity, as long as a behavioral event not conforming to the predetermined event is detected, the participant is determined to be in the speaking behavior.

Figure 6:
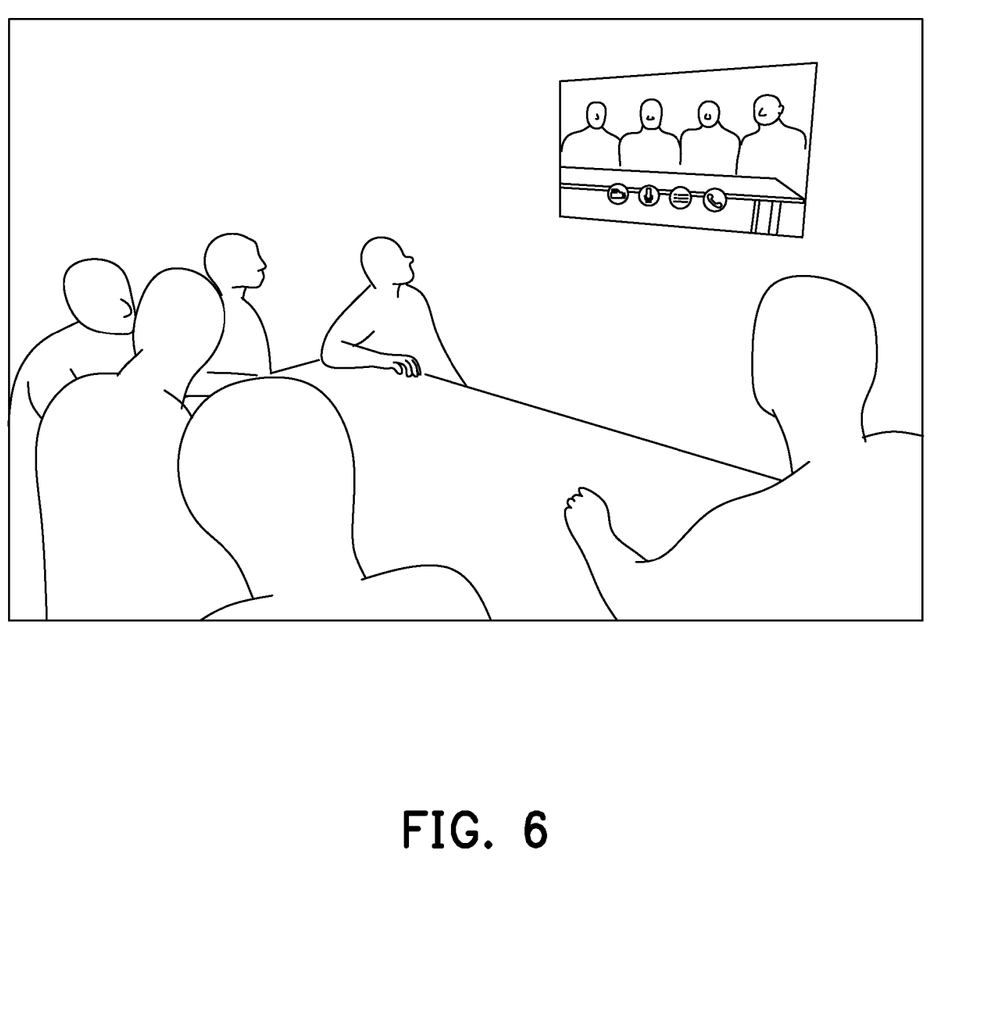
FIG. 6 is a schematic diagram of an application scenario of the video conference according to an embodiment of the disclosure.

FIG. 6 is a schematic diagram of an application scenario of the video conference according to an embodiment of the disclosure. As shown in FIG. 6, multiple participants in the conference room at the local end are having a video conference with participants at the remote end through the video conferencing system 100. The video conferencing system 100 can switch audio reception for speakers and non-speakers in the same conference space according to the embodiments of the disclosure. For example, when one participant A in the same conference space needs to discuss with another participant B temporarily, the non-speaking behavior may be utilized so that the video conferencing system 100 filter the voices of the participants A and B, thereby other participants in the remote end are not affected by the voices of the participants A and B at the local end.

In addition, the processor 110 can further provide a user interface in the display device 150 to display the screen of each participant in the video conference. In an embodiment, by identifying the video signal, the processor 110 identifies each participant included in the video signal, obtains a video clip corresponding to each participant from the video signal, displays the user interface on the display device 150, and displays the video clip corresponding to each participant on the user interface.

Figure 7:
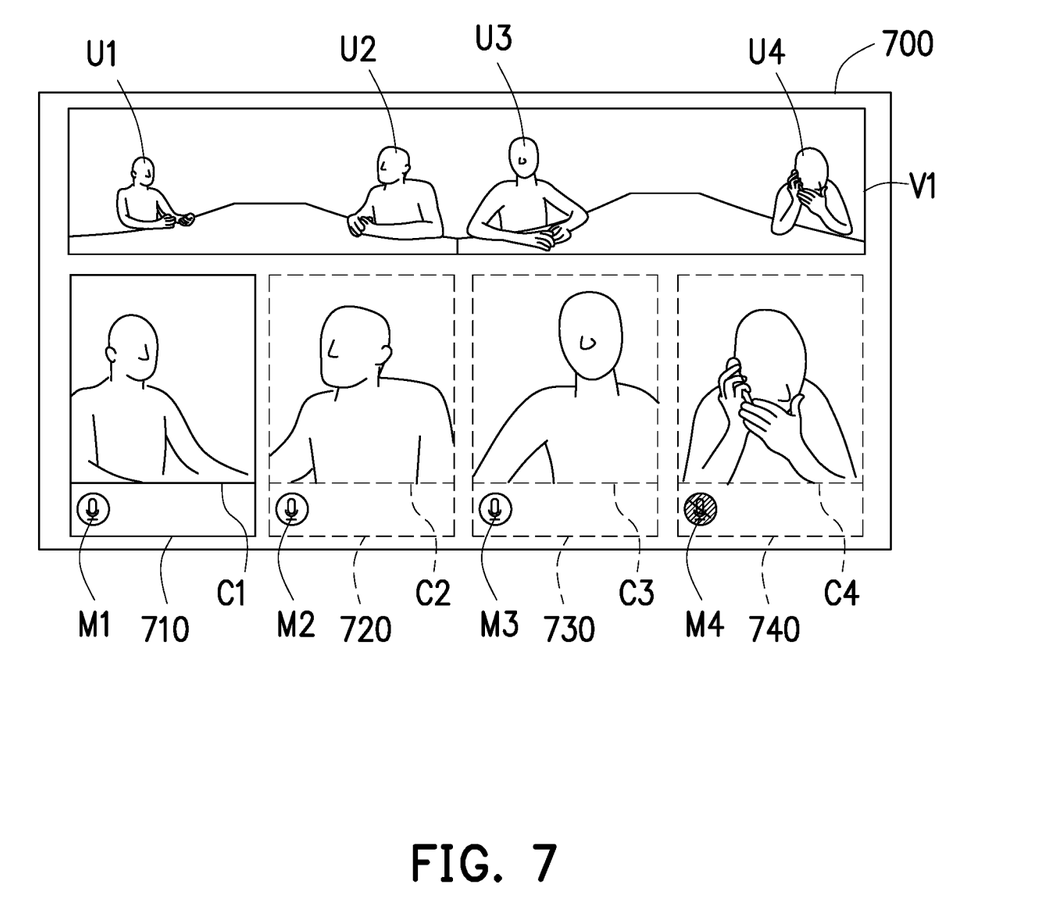
FIG. 7 is a schematic diagram of a user interface according to an embodiment of the disclosure.

FIG. 7 is a schematic diagram of a user interface according to an embodiment of the disclosure. Please refer to FIG. 7. A user interface 700 includes an area V1 used to present the local video signal and a plurality of display areas 710 to 740. The quantity of the display areas 710 to 740 is according to the quantity of participants identified in the video signal. In this embodiment, four participants U1 to U4 are used as an example for illustration. However, the disclosure is not limited thereto. The display areas 710 to 740 are respectively used to display video clips C1 to C4 corresponding to participants U1 to U4. In other embodiments, representative human images (static images) corresponding to the participants U1 to U4 may also be displayed in the display areas 710 to 740 respectively.

In the embodiment shown in FIG. 7, it is assumed that the participant U4 is determined to be a non-speaker in the non-speaking behavior, and the participants U1 to U3 are determined to be speakers in the speaking behavior. In the display area 740 displaying the video clip C4 corresponding to the participant U4 (a non-speaker), a mute mark M4 is displayed. In the display areas 710 to 730 displaying the video clips C1 to C3 corresponding to the participants U1 to U3 (speakers), audio reception marks M1 to M3 are displayed respectively.

In addition, corresponding switch buttons may be further disposed in each of the display areas 710 to 740 for manual switching between audio reception and voice filtering. For example, the audio reception marks M1 to M3 and the mute mark M4 have a switch function, and each participant U1 to U4 can be manually controlled to be in an audio reception state or a mute state. For example, when the mute mark M4 is enabled, the mute mark M4 is switched to the audio reception mark, and the state is switched to audio reception of the participant U4. For example, when the audio reception mark M1 is enabled, the audio reception mark M1 is switched to the mute mark, and the state is switched to voice filtering of the participant U1.

In addition, visual display can be further used to distinguish the speaker who is speaking from other speakers who are not currently speaking. For example, taking the embodiment shown in FIG. 7, assuming that the speaker who is speaking is the participant U1, then the display area 710 is displayed in a bold frame, and the display areas 720 to 740 are displayed in a dotted frame. However, the above is merely an example and the disclosure is not limited thereto.

In addition, in an embodiment, it can be further configured so that the display device 150 displays the user interface 700 simultaneously on the video screen of other participants at the remote end. Alternatively, on the video screen where the display device 150 displays other participants at the remote end, merely the display areas 720 to 740 are displayed. Alternatively, another display device (such as a projector) is set to display the video screen of other participants at the remote end, and the user interface 700 is displayed on the display device 150.

In summary, this disclosure can identify the relative position of each participant in the conference space in the video signal, and based on whether each participant is in the non-speaking behavior, the voice of the individual participant is automatically filtered/received. In addition, after starting the video conference, the disclosure can further automatically match the human image of the participant with the corresponding human voice of participant, and the behavioral event and the sound intensity are simultaneously used to determine whether the participant is in the non-speaking behavior, so that the identified result is accurate. In addition, the disclosure merely needs to define the types of the predetermined events (the non-speaking behavior) without the need to pre-establish an image database of human behavior, and the behavior recognition can be realized immediately.

What is claimed is:

1. A method for switching audio reception in a video conference, comprising using a processor to execute the following in a case of starting a video conference, comprising:
identifying a sound intensity of a human voice separated from an audio signal;
obtaining relative positions of a plurality of participants in a conference space and a behavioral event of each of the participants by identifying a video signal;
determining whether one of the participants matching the human voice is in a non-speaking behavior based on the sound intensity of the human voice and the behavioral event of the one of the participants matching the human voice;
in response to the one of the participants matching the human voice being determined to be a non-speaker in the non-speaking behavior, adjusting an audio reception range of an audio reception device to filter a voice of the non-speaker based on the relative position of the non-speaker in the conference space; and
in response to the one of the participants matching the human voice being determined to be a speaker not in the non-speaking behavior, adjusting the audio reception range of the audio reception device to receive a voice of the speaker based on the relative position of the speaker in the conference space,
wherein in a case where the sound intensity is less than a predetermined value and the behavioral event of the one of the participants matching the human voice conforms to a predetermined event, the one of the participants matching the human voice is determined to be the non-speaker.

2. The method for switching audio reception in the video conference as claimed in claim 1, wherein obtaining the relative positions of the plurality of participants in the conference space and the behavioral event of each of the participants by identifying the video signal comprises:
through a human image recognition module, identifying each of the participants comprised in the video signal and obtaining the relative position of each of the participants in the conference space; and
through an image recognition module, identifying the behavioral event of each of the participants.

3. The method for switching audio reception in the video conference as claimed in claim 1, further comprising using the processor to execute the following in the case of starting the video conference, comprising:
separating the human voice from the audio signal through a voiceprint recognition module after receiving the audio signal; and
matching the human voice with a corresponding one of the participants.

4. The method for switching audio reception in the video conference as claimed in claim 3, wherein matching the human voice with the corresponding one of the participants comprises:
executing a sound source positioning algorithm to determine a source position of the human voice in the conference space; and
matching the human voice with the corresponding one of the participants based on the relative position and the source position.

5. The method for switching audio reception in the video conference as claimed in claim 1, wherein identifying the sound intensity of the human voice separated from the audio signal comprises:
through an audio recognition module, recognizing the sound intensity of the human voice;
wherein n a case where the behavioral event of the one of the participants matching the human voice conforms to the predetermined event and the sound intensity is not less than the predetermined value, the one of the participants matching the human voice is determined to be the speaker.

6. The method for switching audio reception in the video conference as claimed in claim 1, after starting the video conference through the processor, further comprising:
capturing images through an image capturing device at intervals of a sampling time to obtain the video signal; and
receiving voices through the audio reception device at the intervals of the sampling time to obtain the audio signal.

7. The method for switching audio reception in the video conference as claimed in claim 1, further comprising:
by identifying the video signal through the processor, identifying each of the participants comprised in the video signal and obtaining a video clip corresponding to each of the participants from the video signal; and
displaying a user interface on a display device through the processor and displaying the video clip corresponding to each of the participants on the user interface.

8. The method for switching audio reception in the video conference as claimed in claim 7, wherein the user interface comprises a plurality of display areas, each of the display areas corresponds to each of the participants, and each of the display areas is configured to display the video clip corresponding to each of the participants,
after displaying the user interface on the display device through the processor, further comprising:
displaying a mute mark in one of the display areas displaying the video clip corresponding to the non-speaker; and
displaying an audio reception mark in another one of the display areas displaying the video clip corresponding to the speaker.

9. The method for switching audio reception in the video conference as claimed in claim 1, wherein filtering the voice of the non-speaker comprises:

through the processor, based on the relative position of the non-speaker in the conference space, filtering the human voice corresponding to the relative position in an audio signal.

10. A video conferencing system, comprising:

a storage storing an application program;

an image capturing device obtaining a video signal;

an audio reception device, configured to obtain an audio signal; and a processor coupled to the storage, the image capturing device, and the audio reception device and configured to:

execute the application program to start a video conference and in a case of starting the video conference, comprising:

identifying a sound intensity of a human voice separated from the audio signal;

obtaining relative positions of a plurality of participants in a conference space and a behavioral event of each of the participants by identifying a video signal;

determining whether one of the participants matching the human voice is in a non-speaking behavior based on the sound intensity of the human voice and the behavioral event of the one of the participants matching the human voice;

in response to the one of the participants matching the human voice being determined to be a non-speaker in the non-speaking behavior, adjusting an audio reception range of an audio reception device to filter a voice of the non-speaker based on the relative position of the non-speaker in the conference space; and in response to the one of the participants matching the human voice being determined to be a speaker not in the non-speaking behavior, adjusting the audio reception range of the audio reception device to receive a voice of the speaker based on the relative position of the speaker in the conference space, wherein in a case where the sound intensity is less than a predetermined value and the behavioral event of the one of the participants matching the human voice conforms to a predetermined event, the one of the participants matching the human voice is determined to be the non-speaker.

11. The video conferencing system as claimed in claim 10, wherein the storage comprises a human image recognition module and an image recognition module, and the processor is configured to:

through the human image recognition module, identify each of the participants comprised in the video signal and obtain the relative position of each of the participants in the conference space;

through the image recognition module, identify the behavioral event of each of the participants.

12. The video conferencing system as claimed in claim 10, wherein the storage comprises a voiceprint recognition module, and the processor is configured to:

separate the human voice from the audio signal through the voiceprint recognition module; and match the human voice with a corresponding one of the participants.

13. The video conferencing system as claimed in claim 12, wherein the processor is configured to:

execute a sound source positioning algorithm to determine a source position of the human voice in the conference space; and match the human voice with the corresponding one of the participants based on the relative position and the source position.

14. The video conferencing system as claimed in claim 10, wherein the storage comprises an audio recognition module and the processor is configured to:

through the audio recognition module, recognize the sound intensity of the human voice;

wherein in a case where the behavioral event of the one of the participants matching the human voice conforms to the predetermined event and the sound intensity is not less than the predetermined value, the one of the participants matching the human voice is determined to be the speaker.

15. The video conferencing system as claimed in claim 10, wherein the processor is configured to:

capture images through an image capturing device at intervals of a sampling time to obtain the video signal; and receive voices through the audio reception device at the intervals of the sampling time to obtain the audio signal.

16. The video conferencing system as claimed in claim 10, wherein the processor is configured to:

by identifying the video signal, identify each of the participants comprised in the video signal and obtain a video clip corresponding to each of the participants from the video signal; and display a user interface on a display device and display the video clip corresponding to each of the participants on the user interface.

17. The video conferencing system as claimed in claim 16, wherein the user interface comprises a plurality of display areas, each of the display areas corresponds to each of the participants, and each of the display areas is configured to display the video clip corresponding to each of the participants, wherein the processor is configured to:

display a mute mark in one of the display areas displaying the video clip corresponding to the non-speaker; and display an audio reception mark in another one of the display areas displaying the video clip corresponding to the speaker.

18. The video conferencing system as claimed in claim 10, wherein the processor is configured to:

based on the relative position of the non-speaker in the conference space, filter the human voice corresponding to the relative position in an audio signal.

* * * * *